United States Patent [19]
Szmuszkovicz et al.

[11] 3,714,186
[45] Jan. 30, 1973

[54] 7-(1-PYRROLIDINYL)-ENDO-7-NORCARANOL AND ITS METHOD OF PREPARATION

[75] Inventors: Jacob Szmuszkovicz; Elisabeth S. Cerda, both of Kalamazoo, Mich.

[73] Assignee: The Upjohn Company, Kalamazoo, Mich.

[22] Filed: June 2, 1971

[21] Appl. No.: 149,380

Related U.S. Application Data

[63] Continuation-in-part of Ser. No. 791,143, Jan. 14, 1969, abandoned.

[52] U.S. Cl...260/326.5 R, 260/326.81, 260/326.85, 260/617 F, 424/274

[51] Int. Cl. ...........................C07d 27/02
[58] Field of Search ..............260/326.5 R

[56] References Cited

UNITED STATES PATENTS 3,654,305  4/1972  German..................260/326.5

*Primary Examiner*—Alex Mazel
*Assistant Examiner*—Joseph A. Narcavage
*Attorney*—Roman Saliwanchik and John Jekich

[57] ABSTRACT

A process for the preparation of endo-7-norcaranol and intermediate compounds prepared by said process.

5 Claims, No Drawings

7-(1-PYRROLIDINYL)-ENDO-7-NORCARANOL AND ITS METHOD OF PREPARATION

This application is a continuation-in-part of our copending application Ser. No. 791,143, filed Jan. 14, 1969, and now abandoned.

BRIEF SUMMARY OF THE INVENTION

The novel process for the preparation of endo-7-norcaranol is illustrated by the following equations:

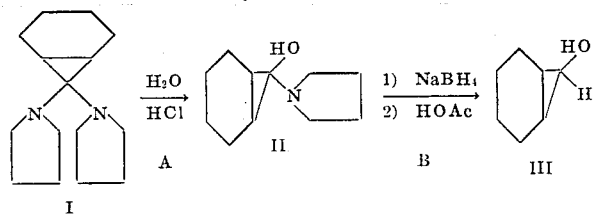

The novel intermediate, 7-(1-pyrrolidinyl)-endo-7-norcaranol has the formula II. This invention also includes the acid addition salts of the compound of formula II.

DETAILED DESCRIPTION

The first step (A) in the process for preparing endo-7-norcaranol involves hydrolyzing 1,1'-(7-norcarylidene)dipyrrolidine in the presence of a mineral acid such as hydrochloric acid to form 7-(1-pyrrolidinyl)-endo-7-norcaranol. Other mineral acids which can be employed include hydrobromic, hydriodic, sulfuric, phosphoric, nitric and sulfamic acids. This hydrolysis is conducted in the presence of a water-immiscible solvent (e.g., ether) for 1,1'-(7-norcarylidene)dipyrrolidine. The molar ratio of acid to 1,1'-(7-norcarylidene)-dipyrrolidine is preferably 7:1, but it may vary from 2:1 to 20:1. Other solvents that may be utilized include dibutyl ether, methylene chloride, chloroform and the like. The reaction takes place readily at room temperature; however, temperatures of 0°–30°C. may be utilized if desired. Conventional recovery procedures, such as filtration can be used to recover the 7-(1-pyrrolidinyl-endo-7-norcaranol from the reaction mixture, followed by recrystallization if so desired.

In step (B), 7-(1-pyrrolidinyl)-endo-7-norcaranol (II) is reduced to endo-7-norcaranol. This reduction is accomplished by reaction (II) with sodium borohydride in the presence of a solvent, such as methanol, ethanol and the like, ethanol being preferred. The molar ratio of 7-(1-pyrrolidinyl)-endo-7-norcaranol to sodium borohydride is preferably 1:5; however, this ratio may vary from 1:1 to 1:10. This reaction readily takes place at a temperature of 25°C.; however, temperatures ranging from 0°–78°C. may be utilized if desired. The crude endo-7-norcaranol is isolated from the reaction mixture by evaporating the solvent, extracting the residue with a mixture of water and ether, separating and acidifying the ethereal layer with aqueous acetic acid, neutralizing the acid, recovering a solid from the ether layer and recrystallizing the solid, e.g., from Skellysolve B hexanes.

The acid addition salts of the invention comprise the salts of the compound of formula II above with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids and the like.

Endo-7-norcaranol is known in the art and, being a medium molecular weight alcohol, it has utility as an antifoaming agent.

In addition to being an intermediate for preparing endo-7-norcaranol, the novel compound 7-(1-pyrrolidinyl)-endo-7-norcaranol also exhibits pharmacological activity. For example, when this compound is administered intraperitoneally to mice at dosages of from 5 to 100 mg/kg, it acts as a stimulant. Also, when administered intraperitoneally to mice at dosages of from 5 to 100 mg/kg, it acts as a nicotine antagonist. The acid addition salts also exhibit these activities when administered intraperitoneally to mice.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The following examples are set forth to illustrate the invention and to enable persons skilled in the art to better understand and practice the invention and are not intended to limit the same.

Example 1  1,1'-(7-Norcarylidene)dipyrrolidine

Pyrrolidine (56.9 g.; 0.8 mole) is stirred under a nitrogen atmosphere and heated to reflux. 2-Chlorocycloheptanone (29.3 g.; 0.18 mole) is added dropwise at such a rate as to keep the temperature at 85°–90°C. after removal of the heat source. Reflux is continued for three hours and the reaction mixture is allowed to stand overnight. Water (100 ml.) is added and the mixture is poured into a cold solution of 30 g. of sodium carbonate in 200 ml. water and allowed to stand. The solid that forms is separated from the mixture by filtration and the solid is washed with water and is then dissolved in ether. The solution is dried with anhydrous magnesium sulfate, concentrated to about 100 ml., and cooled in a solid carbon dioxide-acetone bath. The resulting crystalline product is recovered by filtration and washed with a small amount of cold ether. There is thus obtained 17.0 g. of 1,1'-(7-norcarylidene)dipyrrolidine, melting point 45°–46°C.

Anal.

Calcd. for $C_{15}H_{26}N_2$: C, 76.95; H, 11.16; N, 11.75.

Found: C, 76.86; H, 11.18; N, 11.95.

Example 2  7-(1-Pyrrolidinyl)-endo-7-norcaranol

A solution of 11.7 g. (0.05 mole) of 1,1'-(7-norcarylidene)-dipyrrolidine in 125 ml. of ether is stirred with 125 ml. of 10 percent aqueous hydrochloric acid for 4 hours. The aqueous acid layer is separated, cooled and made basic with 50 percent aqueous sodium hydroxide. The solid which separates is filtered, washed with water and crystallized from 50 ml. of Skellysolve B hexanes to yield 4.57 g. of 7-(1-pyrrolidinyl)-endo-7-norcaranol in the form of off-white crystals, melting point 80°–85°C.

Anal.

Calcd. for $C_{11}H_{19}NO$: C, 72,88; H, 10.57; N, 7.73.

Found: C, 72.60; H, 10.48; N, 7.76.

Example 3  7-(1-Pyrrolidinyl)-endo-7-norcaranol hydrochloride

A solution of 3.63 g. (0.02 mole) of 7-(1-pyrrolidinyl)-endo-7-norcaranol in ether is treated with ethereal hydrogen chloride. The precipitate is filtered and washed with ether to give 4.27 g. of a white solid, melting point 95°–100°C. Crystallization of this solid from ethyl acetate yields 2.60 g. of 7-(1-pyrrolidinyl)-endo-7-norcaranol hydrochloride in the form of yellow needles, melting point 104°C.(dec.).

Anal.
  Calcd. for C₁₁H₁₉NO·HCl: C,60.68;H,9.26;Cl,16.28; N,6.43.
  Found: C,60.63;H,9.22;Cl,16.39;N,6.49.

Example 4 Endo-7-norcaranol

A solution of 5.44 g. (0.03 mole) of 7-(1-pyrrolidinyl)-endo-7-norcaranol in 100 ml. of absolute ethanol is added dropwise and with cooling to a stirred suspension of 5.40 g. of sodium borohydride in 100 ml. absolute ethanol under a nitrogen atmosphere. The mixture is stirred for 6 hours and is allowed to stand overnight. The ethanol is removed in vacuo and 100 ml. of water and 100 ml. of ether are added to the residue. The mixture is shaken and the layers are separated. The ether layer is washed with 5 percent aqueous acetic acid until acidic. The ether solution is washed with dilute aqueous sodium bicarbonate until all the acetic acid is neutralized, then with a saturated solution of sodium chloride and dried over magnesium sulfate. The ether is removed in vacuo to leave 2.86 g. of white, crystalline product, melting point 50°–57°C. Crystallization from 15 ml. of Skellysolve B hexanes gives 1.32 g. of endo-7-norcaranol in the form of colorless needles, melting point 61°–63°C.

Anal.
  Calcd. for C₇H₁₂O: C, 74.95; H, 10.78.
  Found: C, 73.65; H, 10.68.

Endo-7-norcaranol is a known alcohol. It can be used for the same purposes as alcohols of like molecular weight, particularly as intermediates in forming esters useful as plasticizers or in forming esters of thiocyanoacetic acid or α-thiocyanobutyric acid which are useful [See Compt. Rend. Acad. Sci, U.R.S.S. 31, 610-13 (1941) (CA 37:480)]as insecticides.

We claim:
1. A compound selected from the group consisting of
   a. a compound having the formula

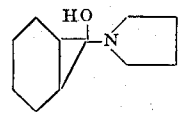

and
   b. the addition salts with pharmacologically acceptable acids of the compound of the above formula.

2. A compound of claim 1 having the formula

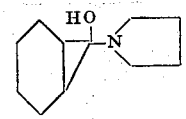

3. The hydrochloride of the compound of claim 2.

4. A process for the preparation of a compound having the formula

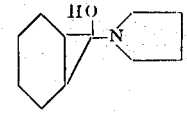

which comprises hydrolyzing a compound having the formula

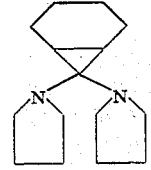

in the presence of a mineral acid.

5. The process of claim 4 wherein the acid is hydrochloric acid.

* * * * *